United States Patent [19]

Martelli

[11] Patent Number: 4,810,144
[45] Date of Patent: Mar. 7, 1989

[54] TUBE CONNECTOR

[75] Inventor: Robert A. Martelli, Bristol, Conn.

[73] Assignee: Illinois Tool Works Inc., Chicago, Ill.

[21] Appl. No.: 155,144

[22] Filed: Feb. 8, 1988

[51] Int. Cl.[4] ............................................. F16B 37/04
[52] U.S. Cl. .................................... 411/182; 411/510;
411/508; 411/913; 411/176; 411/520; 411/427;
403/260; 403/405.1; 29/512; 29/523
[58] Field of Search ............................... 411/508–510,
411/913, 176–177; 180–182, 520–521,
526–527, 427; 403/260, 405.1; 29/512, 523

[56] References Cited

U.S. PATENT DOCUMENTS

| | | | |
|---|---|---|---|
| 2,618,009 | 11/1952 | Tinnerman | 411/436 X |
| 2,654,620 | 10/1953 | Tinnerman | 411/176 X |
| 2,670,226 | 2/1954 | Becker | 411/521 X |
| 2,972,495 | 2/1961 | Yalen | 403/260 X |
| 3,006,673 | 10/1961 | Swick | 403/122 |
| 3,027,609 | 4/1962 | Yalen et al. | 411/526 X |
| 3,129,444 | 4/1964 | Kahn | 29/523 |
| 3,135,309 | 6/1964 | Soltysik | 411/176 |
| 3,320,846 | 5/1967 | Orain | 411/521 |
| 3,864,051 | 2/1975 | Reid | 411/427 X |
| 3,921,280 | 11/1975 | King, Jr. | 29/523 X |
| 4,604,014 | 8/1986 | Frano | 411/510 X |

FOREIGN PATENT DOCUMENTS 227402  3/1960  Australia ............................. 411/520

Primary Examiner—Gary L. Smith
Assistant Examiner—Curtis B. Brueske
Attorney, Agent, or Firm—John P. O'Brien; Thomas W. Buckman

[57] ABSTRACT

A tube connector comprising a first member and a second member, each member being made from a sheet metal stamping. Each member includes an annular portion, a tubular barrel, and plural legs. The tubular barrel extends from an inner periphery of the annular portion. The legs extend outwardly from the annular portion and are adapted to flex axially so as to facilitate insertion of such member into the tube through one end of the tube. The legs have sharp edges tending to dig aggressively into an inner wall of the tube so as to resist withdrawal and rotation of such member. The tubular barrel of the first member fits within and extends through the tubular barrel of the second member and is crimped at one end so as to secure the tubular barrel of the second member bears at one end agains the annular portion of the first member. The tubular barrel of the first member is internally threaded and consequently deformed so as to fit tightly within the tubular barrel of the second member.

8 Claims, 1 Drawing Sheet

TUBE CONNECTOR

FIELD OF THE INVENTION

This invention pertains to improvements in a tube connector, which is useful to connect an article to one end of a tube.

BACKGROUND OF THE INVENTION

A tube connector of a generally useful type is exemplified in Pleickhardt et al. U.S. Pat. No. 4,518,293, which discloses several forms of such a connector. In certain forms, the tube connector is adapted to receive a threaded fastener In another form, the tube connector includes, as one of its components, a threaded fastener In each form, except for the threaded fastener, the tube connector is made from a sheet metal stamping.

Tube connectors of more specialized types are exemplified in Tinnermann U.S. Pat. No. 2,618,009 and Swick U.S. Pat. No. 3,006,673. Such connectors are useful to connect fittings to tubular legs for furniture.

Typically, as exemplified in each of the three patents noted above, a tube connector employs sharp-edged, radially extending legs, which flex axially so as to facilitate insertion of the tube connector into a tube, but which dig aggressively into the tube wall so as to resist withdrawal of the tube connector from the tube, and so as to resist rotation of the tube connector within the tube.

One disadvantage of a tube connector, as exemplified in Pleickhardt et al. U.S. Pat. No. 4,518,293, is that a lateral force, if imparted to a threaded fastener received by or included in the tube connector, tends to distort adjacent sheet metal portions of the tube connector and to cause the threaded fastener to cant out of axial alignment with the tube. The disadvantage is not overcome in tube connectors exemplified in the other patents noted above.

SUMMARY OF THE INVENTION

This invention provides improvements in a tube connector, which is useful to connect an article to one end of a tube, particularly but not exclusively a tube having an inner wall of circular cross-section. A common use of such a connector is to connect a glide to a tubular leg for furniture. Another possible use is to connect two tubes axially to each other. Diverse other uses are possible.

Broadly, a tube connector according to this invention comprises a first member and a second member. Each member is made from a sheet metal stamping. Spring steel may be advantageously used for each member.

Specifically, each member includes an annular portion, a tubular barrel, and plural legs. The tubular barrel extends axially from an inner periphery of the annular portion. The legs, which extend outwardly from the annular portion, are adapted to flex axially so as to facilitate insertion of such member into the tube through the end of the tube. The legs have sharp edges, which tend to dig aggressively into the inner wall of the tube so as to resist withdrawal of such member from the tube, and so as to resist rotation of such member within the tube.

Additionally, the tubular barrel of the first member fits within and extends through the tubular barrel of the second portion and is crimped at one end so as to secure the tubular barrel of the second member between the annular portion of the first member and the crimped end of the tubular barrel of the first member.

Preferably, the tubular barrel of the second member bears at one end against the annular portion of the first member. Preferably, the tubular barrel of the first member is internally threaded and consequently deformed so as to fit tightly within the tubular barrel of the second member.

Accordingly, the tube connector is adapted to receive a threaded fastener, which can be threadably received by the internally threaded, tubular barrel of the first member. A lateral force, if imparted to the threaded fastener, is borne by adjacent sheet metal portions of both of the first and second members, whereby the threaded fastener is braced in axially spaced locations against canting out of axial alignment with the tube.

Because the tubular barrel of the first member fits tightly within the tubular barrel of the second member, the tube connector has superior torque-resisting and axial holding characteristics.

These and other objects, features, and advantages of this invention will be evident from the following description of a preferred embodiment of this invention, with reference to the accompanying drawing.

BRIEF DESCRIPTION OF THE DRAWING

In FIG. 2, the threaded fastener shown in FIG. 1 has been omitted, and the tube shown in FIG. 1 has been replaced by a tube having an inner wall of square cross-section, the latter tube being shown in phantom lines.

In FIG. 3, other elements shown in FIG. 1 have been omitted. Also, in comparison to FIG. 2, the tube connector 10 has been rotated slightly.

DETAILED DESCRIPTION OF PREFERRED EMBODIMENTS

Figure 1:
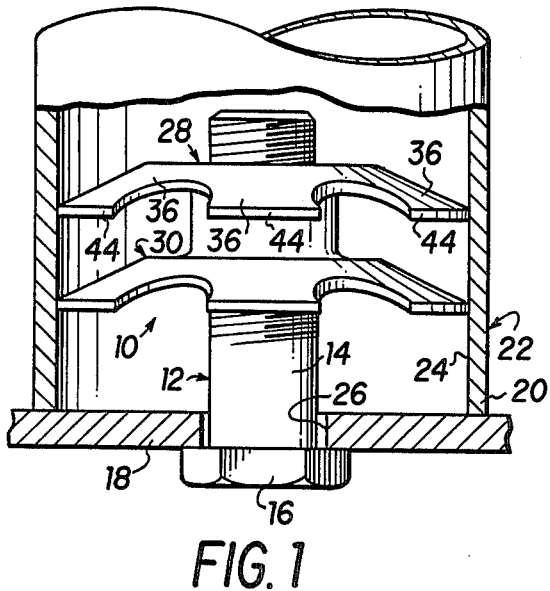
FIG. 1 is a view taken essentially in axial section through a tube connector constituting a preferred embodiment of this invention, as used with a threaded fastener to connect a representative article to one end of a tube having an inner wall of circular cross-section.
Figure 4:
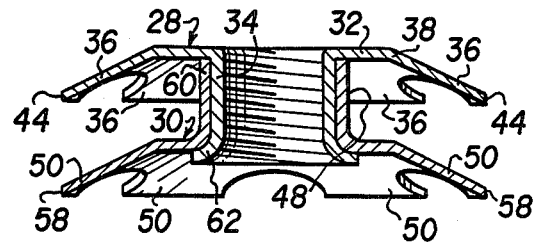
FIG. 4 is a cross-sectional view taken along line 4—4 of FIG. 3 in a direction indicated by arrows.
Figure 2:
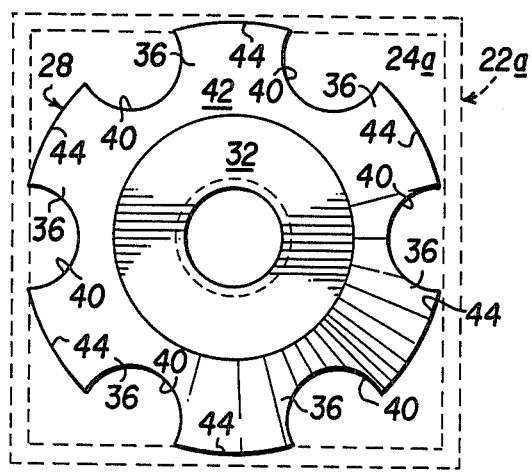
FIG. 2 is a top plan view of the tube connector shown in FIG. 1.
Figure 3:
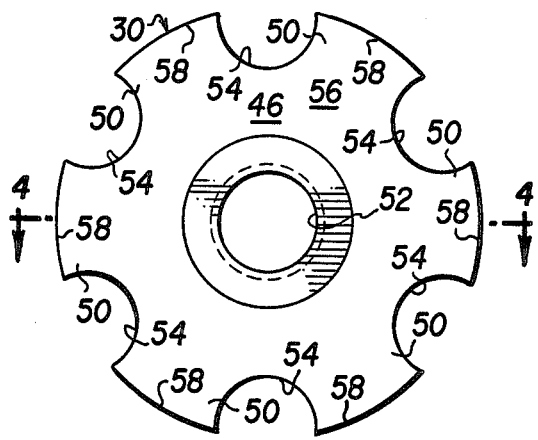
FIG. 3 is a bottom plan view of the tube connector shown in FIG. 1.

As shown in FIG. 1, a tube connector 10 constituting a preferred embodiment of this invention is used with a threaded fastener 12 having a threaded shank 14 and an enlarged, hexagonal, wrench-fitting head 16, to connect a plate 18 to one end 20 of a tube 22 having an inner wall 24 of circular cross-section. The plate 18, which has an aperture 26 admitting the threaded shank 14 but not the enlarged head 16, is intended to be broadly representative of an article to be so connected to the end 20 of the tube 22. As shown in FIG. 2, the tube connector 10 may be also used to connect an article (not shown) to one end of a tube 22a having an inner wall 24a of square cross-section.

Broadly, the tube connector 10 comprises a first member 28 and a second member 30. Each member is made from a sheet metal stamping. Preferably, spring steel is used for each member.

Specifically, the first member 28 includes an annular portion 32, a tubular barrel 34, and six legs 36. The tubular barrel 34 extends axially from an inner periphery 38 of the annular portion 32, as shown, so as to extend outwardly in relation to the end 20 of the tube 22 when the tube connector 10 is inserted into the tube 22. The legs 36, which are defined by semi-circular cutouts 40 in a dished skirt 42 surrounding the annular portion 32, extend outwardly from the annular portion 32 and obliquely in relation to the annular portion 32. The legs 36 are adapted to flex axially so as to facilitate insertion of the first member 28 into the tube 22 through the end 20. An interference fit between the legs 36 and the inside wall 24 of the tube 22 is contemplated, the first member 28 being suitably dimensioned in relation to the tube 22 to provide such a fit. The legs 36 have sharp edges 44, which tend to dig aggressively into the inner wall 24 of the tube 22 so as to resist withdrawal of the first member 28 from the tube 22, and so as to resist rotation of the first member 28 within the tube 22.

Similarly, the second member 30 includes an annular portion 46, a tubular barrel 48, and six legs 50. The tubular barrel 48 extends axially from an inner periphery 52 of the annular portion 46, as shown, so as to extend inwardly in relation to the end 20 of the tube 22 when the tube connector 10 is inserted into the tube 22. The legs 50, which are defined by semi-circular cutouts 54 in a dished skirt 56 surrounding the annular portion 46, extend outwardly from the annular portion 46 and obliquely in relation to the annular portion 46. The legs 50 are adapted to flex axially so as to facilitate insertion of the second member 30 into the tube 22 through the end 20. An interference fit between the legs 50 and the inner wall 24 of the tube 22 is contemplated, the second member 30 being suitably dimensioned in relation to the tube 22 to provide such a fit. The legs 50 have sharp edges 58, which tend to dig aggressively into the inner wall 24 of the tube 22 so as to resist withdrawal of the second member 30 from the tube 22, and so as to resist rotation of the second member 30 within the tube 22.

Broadly, except for the tubular barrels of the respective members, the first member 28 and the second member 30 are similar. As noted above, when the tube connector 10 is inserted into the tube 22, the tubular barrel 34 of the first member 28 extends outwardly in relation to the end 22 of the tube 20 and the tubular barrel 48 of the second member 30 extends inwardly in relation to the end 22 of the tube 20. Moreover, when the tube connector 10 is inserted into the tube 22, each of the tubular barrels 34 and 48 extends axially in relation to the tube 22.

Additionally, the tubular barrel 34 of the first member 28 fits within and extends through the tubular barrel 48 of the second member 30. The tubular barrel 48 of the second member 30 bears at one end 60 against the annular portion 32 of the first member 28. The tubular barrel 34 of the first member 28 is crimped at one end 62, in a radially outward sense, so as to secure the tubular barrel 48 of the second member 30 around the tubular barrel 34 of the first member 28 and tightly between the annular portion 32 of the first member 28 and the crimped end 62. Herein, "crimped" is intended to be broadly understood so as to refer to the end 62 being crimped, flared, or staked circumferentially, as shown, or to the end 62 being crimped, flared, or staked at one or more segments around its circumference.

Moreover, after the tubular barrel 48 of the second member 30 has been secured around the tubular barrel 34 of the first member 28 and tightly between the annular portion 32 of the first member 28 and the crimped end 62, the tubular barrel 34 of the first member 28 is internally threaded, preferably roll-threaded, and consequently deformed (i.e., deformed as a consequence of being so threaded) so as to fit tightly within the tubular barrel 48 of the second member 30.

Accordingly, the tube connector 10 is adapted to receive the threaded fastener 12, which can be threadably received at the threaded shank 14 by the internally threaded, tubular barrel 34 of the first member. Therefore, a lateral force, if imparted to the threaded fastener 12, is borne by adjacent sheet metal portions of the first and second members 12 and 14 respectively, whereby the threaded fastener 12 is braced in axially spaced locations against canting out of axial alignment with the tube 22.

Because the tubular barrel 34 of the first member 28 fits tightly within the tubular barrel 48 of the second member 30, as a consequence of the tubular barrel 34 of the first member 28 being internally threaded after the tubular barrel 48 of the second member 30 has been secured, the tubular barrel 48 strengthens and reinforces the tubular barrel 34, whereby the tube connector 10 has superior torque-resisting and axial holding characteristics.

When used to secure an article (not shown) to one end of a tube 22a having an inner wall 24a of square cross-section, a diagonally opposite pair of the legs 36 of the first member 28 tend to dig aggressively into adjacent areas of the inner wall 24a, as shown in FIG. 2. Similarly, a diagonally opposite pair of the legs 50 of the second member 50 tend to dig aggressively into adjacent areas of the inner wall 24a. Other legs of the first and second members 28 and 30 respectively fit closely within and bear against adjacent areas of the inner wall 24a.

Other modifications may be made without departing from the spirit and scope of this invention.

I claim:

1. A tube connector comprising a first member and a second member, each member being made from a sheet metal stamping;

each member including an annular portion, which has an inner periphery, a tubular barrel, which extends axially from the inner periphery of the annular portion, and plural legs, which extend outwardly from the annular portion, which are adapted to flex axially so as to facilitate insertion of such member into a tube having an inner wall through one end of the tube, and which have sharp edges tending to dig aggressively into the inner wall of the tube so as to resist withdrawal of such member from the tube, and so as to resist rotation of such member within the tube;

the tubular barrel of the first member fitting within and extending through the tubular barrel of the second portion and being crimped at one end so as to secure the tubular barrel of the second member between the annular portion of the first member and the crimped end of the tubular barrel of the first member.

2. The tube connector of claim 1 wherein the tubular barrel of the first member is deformed so as to fit tightly within the tubular barrel of the second member.

3. The tube connector of claim 1 wherein the tubular barrel of the first member is internally threaded.

4. The tube connector of claim 3 wherein the tubular barrel of the first member is internally threaded and consequently deformed so as to fit tightly within the tubular barrel of the second member.

5. The tube connector of claim 1 wherein the tubular barrel of the second member bears at one end against the annular portion of the first member.

6. The tube connector of claim 5 wherein the tubular portion of the first member is internally threaded.

7. The tube connector of claim 5 wherein the tubular barrel of the first member is deformed so as to fit tightly against the tubular barrel of the second member.

8. The tube connector of claim 7 wherein the tubular barrel of the first member is internally threaded and consequently deformed so as to fit tightly within the tubular barrel of the second member.

* * * * *